Inventors
Ralph E. Hobbs
Walter W. Yarrison
By their Attorney

United States Patent Office 3,510,968
Patented May 12, 1970

3,510,968
SHOES AND SHOEMAKING METHODS
Ralph E. Hobbs, Jr., Salem, and Walter W. Yarrison, Beverly, Mass., assignors to USM Corporation, Flemington, N.J., a corporation of New Jersey
Filed June 26, 1968, Ser. No. 740,225
Int. Cl. A43b 13/12; A43d 65/00
U.S. Cl. 36—30                                                    8 Claims

ABSTRACT OF THE DISCLOSURE

Shoe and shoemaking method including the steps of providing a mold assembly for the molding of a sole, the mold assembly including a bottom mold member, side mold means and a top mold member, placing a tread insert member on said bottom mold member, said tread insert member being provided with a bead member affixed to its foot-facing side, and introducing molding material between the top mold member and the bottom mold member whereby to fill the mold cavity, the material being adapted to flow substantially around the bead, whereby upon subsequent solidification of the molding material the tread insert member is securely anchored in the molding material by the bead attached to the tread member to form a composite sole.

BACKGROUND OF THE INVENTION

Field of the invention

This invention relates to shoes and shoemaking methods and is directed more particularly to a shoe and shoemaking method in which there is utilized a tread member anchored in molding material to form a composite sole.

Description of the prior art

It has become commonplace to injection mold sole and heel units directly onto lasted uppers and also as individual units for subsequent attachment to lasted uppers, as by adhesive means. In an effort to improve the appearance and wear characteristics of such shoes, manufacturers have incorporated tread inserts, usually of leather, which are embedded in the molded sole and impart to the sole the appearance of an all leather sole as well as as the wear characteristics desired.

Certain molded sole materials, however, such as for example polyvinylchloride, do not readily adhere to most leathers used in the manufacture of tread members. Accordingly, such tread members which are retained in position in the shoe bottom solely by virtue of physical engagement with the adjacent surfaces of the molded sole tend to work loose after a period of use. Normal flexing of the shoe tends to displace the tread member which may result in premature failure.

One approach used to overcome the above problem contemplates the provision in the rear portion of a forepart tread member of a plurality of openings or apertures. In the molding operation the fluid soling material flows through the apertures thus providing a plurality of connectors, or legs, connecting the breast portion of the heel to the midsole structure and extending through the apertures of the tread member. These legs hold the rear margin of the tread sole against any appreciable displacement relative to the heel.

While the above feature has proved successful to a degree, it is deemed desirable to incorporate in the tread member means for anchoring the member substantially around its entire margin, as opposed to anchoring of one portion only.

SUMMARY OF THE INVENTION

It is an object of the present invention to provide a shoe having a molded sole with a tread member incorporated therein, the tread member being provided with means proximate to a majority of its periphery for anchoring the tread member securely in the molded sole.

It is a further object of the invention to provide a method for shoe construction, including the steps of providing a mold cavity for the molding of soles, locating a tread member in the cavity, the tread member having means attached to its foot-facing side for anchoring the tread member in molding material, and introducing molding material into the mold cavity whereby to embed the tread member and the anchoring means attached thereto in a molded sole.

With the above and other objects in view, as will hereinafter appear, a feature of the present invention is the provision of a shoe having a molded sole having a tread member embedded therein.

In accordance with a further feature of the invention there is provided a method of shoemaking comprising providing a mold cavity for the molding of a shoe sole, disposing a tread insert in said cavity, said insert having an anchoring means affixed to its foot-facing side, and injecting molding material into said cavity, whereby to embed the tread member and the anchoring means in the molded sole.

The above and other features of the invention, including various novel details of construction and combinations of parts, will now be more particularly described with reference to the accompanying drawings and pointed out in the claims. It will be understood that the particular article and methohd embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which there is shown an illustrative embodiment of the invention from which its novel features and advantages will be apparent.

DESCRIPTION OF THE PREFERRED EMBODIMENTS

Figure 1:
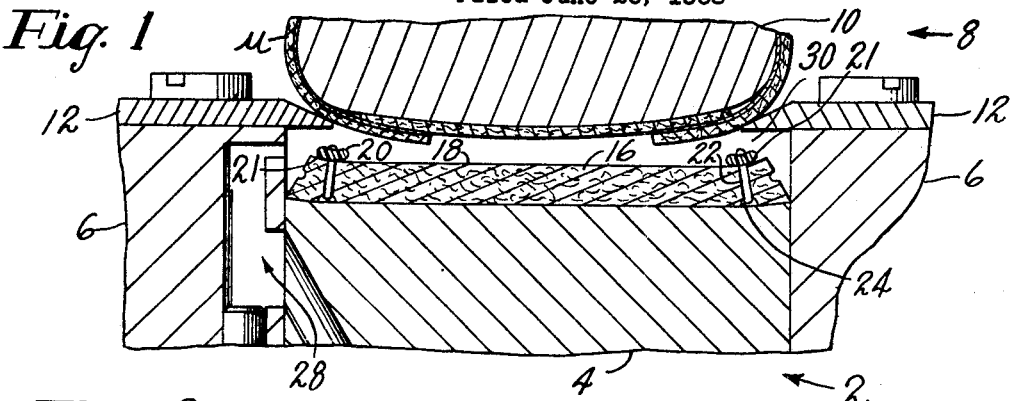
FIG. 1 is a transverse sectional view of a mold assembly and lasted upper illustrative of the inventive method.
Figure 5:
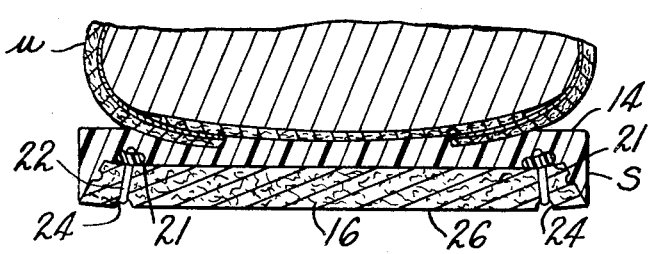
FIG. 5 is a transverse sectional view of one form of article of footwear illustrative of an embodiment of the invention.

Referring to FIG. 1, it may be seen that the illustrative shoemaking method comprises providing a mold assembly 2 having a bottom mold member 4 and side mold means 6. The mold assembly 2 also includes a top mold means 8 which may comprise a footform 10 with an upper $u$ mounted thereon for molding of a sole directly to the upper. Alternatively, the top mold means 8 may comprise an ordinary mold member (not shown) comprising a plate for forming the foot-facing side of a molded sole which may subsequently be attached to a lasted upper, as by adhesive. When the top mold means 8 comprises the footform 10 with lasted upper $u$ mounted thereon, the side mold means 6 may be provided with welt plates 12 for engagement with the lasted upper and for defining a welt extension surface 14 (FIG. 5) in the final product.

In accordance with the illustrative method, a tread member 16 is disposed on the bottom mold member 4.

The tread member 16 has fixed to its foot-facing side 18 a bead 20. The bead 20 may be connected to the tread member 16 by sewing thread 22 which extends through the tread member and the bead. The bead 20 has surfaces 21 inclined from and facing the foot-facing surface 18 of the tread member 16. A channel 24 may be provided on the tread surface 26 of the tread member to receive the thread 22. If stitching is used to attach the bead 20 to the tread member 16 the resultant sole has an appearance very similar to that of the traditional lockstitch shoe.

Figure 4:
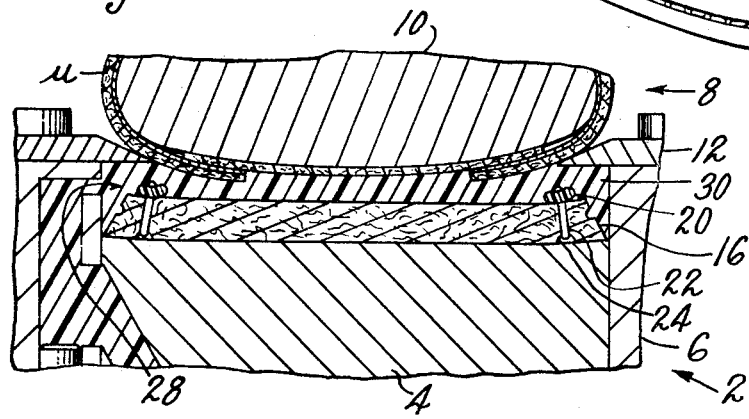
FIG. 4 is similar to FIG. 1, but shows another step in the inventive process.

One or more of the mold members is provided with passage means 28 (FIGS. 1 and 4) interconnecting a mold cavity 30 (FIG. 1) formed by the bottom mold member 4, the side mold means 6, and the top mold means 8, and a source of molten molding material, not shown. The molten molding material may be supplied by a machine of the type disclosed in U.S. Pat. No. 3,358,333, issued Dec. 19, 1967, upon application of C. J. Kitchener et al. Upon activation of a device of the type described in the above-referenced patent, injection molding material is forced through the passage 28 and into the mold cavity 30, as shown in FIG. 4. The molding material flows substantially around the bead member 20 and fills the space between the top mold means 8 and the tread member 16. When the mold cavity 30 is completely filled with molding material, a telltale means (not shown) signals the mold material delivering device to cease operation. The telltale means may, for example, be of the type disclosed in U.S. Pat. No. 3,299,476, issued Jan. 24, 1967, upon application of D. B. McIlvin.

Figure 2:
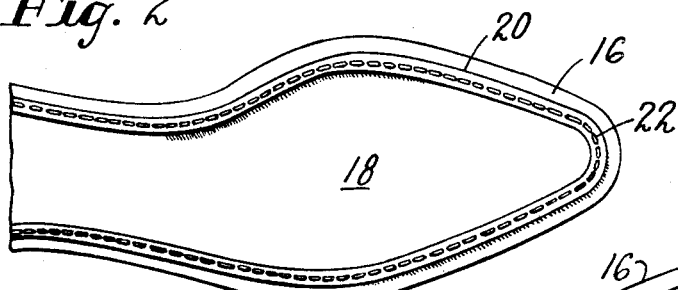
FIG. 2 is a plan view of the foot-facing surface of the tread insert of FIG. 1.
Figure 3:
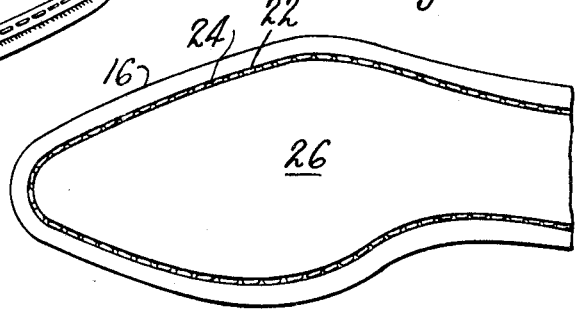
FIG. 3 is a plan view of the tread surface of the tread insert of FIG. 1.

After a lapse of sufficient time for solidification and cooling of the injection molded material, the mold assembly 2 is opened and a molded sole S (FIG. 5) removed therefrom, attached to the upper u, or as a separate article, depending on the nature of the top mold means, as discussed above. Thus, there is provided a molded sole including a tread member 16, the tread member 16 being firmly attached to the molded portion of the sole by virtue of the bead being substantially surrounded by the molding material. Further, inasmuch as the bead may extend along substantially the entire margin of the tread piece, the holding action of the bead influences the tread piece uniformly throughout its length. Normally, a forepart tread member will be provided with the bead starting in the shank area on one side of the tread member, extending forwardly to the toe, bending around the toe and extending rearwardly to the shank portion, terminating on the side opposite from that on which is disposed the opposite end of the bead (FIGS. 2 and 3). Of course, if preferred, the bead may be endless and extend completely around the margin of the tread member.

The molded portion of the sole S retains the tread member 16 despite the flexing stresses present in the ordinary use of footwear. In addition to excellent wear characteristics, the molded sole with the tread insert presents a pleasing appearance inasmuch as the bottom of the sole may be leather and includes the traditional stitching of the Littleway Lockstitch shoe.

Since obvious changes may be made in the illustrated article and method without departing from the scope of the invention, it is intended that all matters contained herein be interpreted in an illustrative and not a limiting sense.

Having thus described our invention, what we claim is new and desire to secure by Letters Patent of the United States is:

1. Method of shoemaking comprising providing a sole mold cavity defined by a bottom mold member and side mold means, placing a tread member on said bottom mold means, said tread member having anchoring means in the form of a bead of material fixed proximate to the edge of the foot-facing surface of the tread member and upstanding therefrom, said bead extending forwardly from one side of the tread member in the shank area, around the toe and to a point on the opposite side of the tread member in the shank area, closing said mold cavity with top mold means, and admitting fluid molding material to the mold cavity, said molding material being flowable between said top mold means and said tread member and substantially around said anchoring means, whereby to form a footwear sole having said tread member and said anchoring means embedded in said molding material.

2. The invention according to claim 1 in which said top mold member comprises a footform for mounting a lasted upper, and the step of closing the mold cavity comprises placing the footform in position for engagement between said upper and said side mold means, and said footwear sole is formed attached to said upper.

3. An article of footwear comprising a composite sole including a molded sole portion, a tread member attached to said molded sole portion, said tread member having a foot-facing surface and a tread surface, and anchoring means in the form of a bead of material fixed proximate to the edge of the foot-facing surface of said tread member and embedded in said molded sole portion, said bead extending forwardly from one side of the tread member in the shank area, around the toe and to a point on the opposite side of the tread member in the shank area.

4. The invention according to claim 3 in which said bead has surfaces inclined from and facing the foot-facing surface of the tread member with molded sole portions being disposed therebetween.

5. The article of claim 3 wherein said bead is sewn to said tread member by stitches extending through said tread member and in part disposed on said tread member.

6. An article of footwear comprising an upper, a composite sole molded onto said upper, said sole comprising a tread member attached to a molded sole portion, said tread member having a foot-facing surface and a tread surface, and anchoring means in the form of a bead of material fixed proximate to the edge of the foot-facing surface of said tread member and embedded in said molded sole portion, said bead extending forwardly from one side of the tread member in the shank area to, around the toe and to a point on the opposite side of the tread member in the shank area, said anchoring means having surfaces inclined from the facing the foot-facing surface of the tread member with molded sole portions being disposed therebetween.

7. The invention according to claim 6 in which stitches attaching said bead to said tread member extend through said tread member and are in part disposed on the tread surface of said tread member.

8. The method of claim 1 wherein said bead of material is fixed to the tread member by stitching through the member.

References Cited
UNITED STATES PATENTS

| | | | |
|---|---|---|---|
| 1,282,398 | 10/1918 | Egerton | 36—30 |
| 1,363,076 | 12/1920 | Ajello | 36—30 |
| 2,183,277 | 12/1939 | Heilhecker | 36—14 |
| 3,116,566 | 1/1964 | Ferreira | 36—30 |
| 3,320,687 | 5/1967 | Leveque | 36—30 |

ALFRED R. GUEST, Primary Examiner

U.S. Cl. X.R.

12—142, 146; 36—14; 264—244